United States Patent
Zobel et al.

(10) Patent No.: US 6,756,433 B1
(45) Date of Patent: Jun. 29, 2004

(54) FLAME-RESISTANT POLYCARBONATE ABS MOULDING MATERIALS

(75) Inventors: Michael Zobel, Köln (DE); Thomas Eckel, Dormagen (DE); Torsten Derr, Dormagen (DE); Dieter Wittmann, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 119 days.

(21) Appl. No.: 10/069,745

(22) PCT Filed: Aug. 22, 2000

(86) PCT No.: PCT/EP00/08161

§ 371 (c)(1),
(2), (4) Date: Feb. 27, 2002

(87) PCT Pub. No.: WO01/18118

PCT Pub. Date: Mar. 15, 2001

(30) Foreign Application Priority Data

Sep. 2, 1999 (DE) .......................... 199 41 827

(51) Int. Cl.⁷ .............................. C08K 5/49; C08K 5/52
(52) U.S. Cl. ...................... 524/118; 524/119; 524/120; 524/124; 524/127
(58) Field of Search ............................. 524/118, 119, 524/120, 124, 127

(56) References Cited

U.S. PATENT DOCUMENTS

| | | | |
|---|---|---|---|
| 3,505,431 A | 4/1970 | Birum | 260/932 |
| 3,711,577 A | 1/1973 | Maier | 260/932 |
| 4,054,544 A | 10/1977 | Albright | 260/2.5 AJ |
| 4,073,767 A | 2/1978 | Birum | 260/45.8 R |
| 4,397,750 A | 8/1983 | Chibnik | 252/51.5 A |
| 5,061,745 A | 10/1991 | Wittmann et al. | 524/139 |
| 5,204,394 A | 4/1993 | Gosen et al. | 524/125 |
| 5,276,066 A | 1/1994 | Paulik et al. | 521/108 |
| 5,552,465 A | 9/1996 | Witmann et al. | 524/139 |
| 5,844,028 A | 12/1998 | Paulik | 524/117 |
| 6,093,759 A | 7/2000 | Gareiss et al. | 524/122 |
| 6,528,561 B1 * | 3/2003 | Zobel et al. | 524/125 |

FOREIGN PATENT DOCUMENTS

| | | |
|---|---|---|
| CA | 2318430 | 7/1999 |
| EP | 0 594 553 | 4/1994 |
| EP | 0 640 655 | 3/1995 |
| EP | 0 728 811 | 8/1996 |
| FR | 1371139 | 8/1964 |
| GB | 2 330 583 | 4/1999 |

* cited by examiner

Primary Examiner—Kriellion A. Sanders
(74) Attorney, Agent, or Firm—Joseph C. Gil; Aron Preis

(57) ABSTRACT

The present invention relates to polycarbonate moulding compositions provided with phosphonate amines and phosphorus compounds, which moulding compositions exhibit excellent flame protection and very good mechanical properties, such as joint line strength or modulus of elasticity, and a good crude shade.

15 Claims, No Drawings

FLAME-RESISTANT POLYCARBONATE ABS MOULDING MATERIALS

The present invention relates to polycarbonate-ABS blends provided with phosphonate amines and phosphorus compounds, which blends exhibit excellent flame protection and very good mechanical properties, such as joint line strength or modulus of elasticity, and a good crude shade.

U.S. Pat. No. 4,073,767 and 5,844,028 describe cyclic phosphorus compounds including phoshorinane rings as suitable flameproofing agents for polyurethanes, polycarbonates, polyesters and polyamides. In U.S. Pat. No. 4,397,750, particular cyclic phosphonate esters are described as efficient flameproofing agents for polypropylene and other polyolefins. U.S. Pat. No. 5,276,066 and U.S. Pat. No. 5,844,028 describe particular (1,3,2-dioxaphosphorinanemethane)-amines which are suitable flameproofing agents for polyurethanes, polyesters, styrene polymers, PVC, PVAc or polycarbonate.

U.S. Pat. No. 3,505,431, French-Patent 1 371 139, U.S. Pat. Nos. 3,711,577, 4,054,544 describe acyclic trisphosphonate amines, some of which are halogenated.

EP-A0 640 655 describes moulding compositions of aromatic polycarbonate, styrene-containing copolymers and graft polymers, which moulding compositions can be rendered flame-resistant with monomeric and/or oligomeric phosphorus compounds.

In EP-A 0 363 608, flame-resistant polymer mixtures of aromatic polycarbonate, styrene-containing copolymer or graft copolymer and oligomeric phosphates are described as flameproofing additives. For some applications, such as, for example, mouldings inside casing parts, the dimensional stability of those mixtures under heat is often inadequate.

In U.S. Pat. No. 5,061,745, polymer mixtures of aromatic polycarbonate, ABS graft polymer and/or styrene containing copolymer and monophosphates are described as flameproofing additives. The level of resistance of those mixtures to stress cracking is often inadequate for the production of thin-walled casing parts.

A combination of phosphonate amines and phosphorus compounds is not described either in WO 9740092 or in EP-A 728 811.

The object of the present invention is to provide polycarbonate moulding compositions having improved flame resistance as a result of improved after-burning times and excellent mechanical properties, such as joint line strength, modulus of elasticity, as well as good processability and a good crude shade. That spectrum of properties is required especially in the case of applications in the field of data technology, such as, for example, for casings for monitors, printers, copiers, etc.

It has now been found that compositions containing polycarbonate and phosphonate amines in combination with phosphorus compounds and/or salts of phosphate compounds and, optionally, other blend partners exhibit the desired properties.

Accordingly, the invention provides compositions containing polycarbonate, at least one phosphonate amine of formula (I)

$$A_{3-y}-N-B_y \quad (I),$$

in which

A represents a radical of formula (IIa)

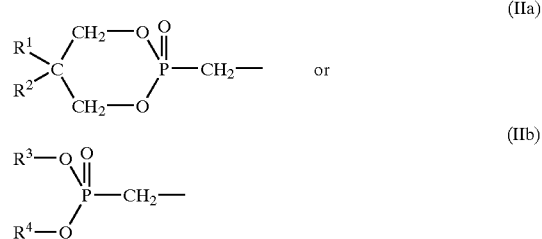

$R^1$ and $R^2$ are each independently of the other unsubstituted or substituted $C_1$–$C_{10}$-alkyl or unsubstituted or substituted $C_6$–$C_{10}$aryl, $R^3$ and $R^4$ are each independently of the other unsubstituted or substituted $C_1$–$C_{10}$-alkyl or unsubstituted or substituted $C_6$–$C_{10}$-aryl, or $R^3$ and $R^4$ together represent unsubstituted or substituted $C_3$–$C_{10}$-alkylene, y represents the numerical values 0, 1 or 2, and the substituents B are each independently hydrogen, optionally halogenated $C_2$–$C_8$-alkyl, unsubstituted or substituted $C_6C_{10}$-aryl, and at least one phosphorus compound of formulae (IIa), (IIb), (IIc) and (IId)

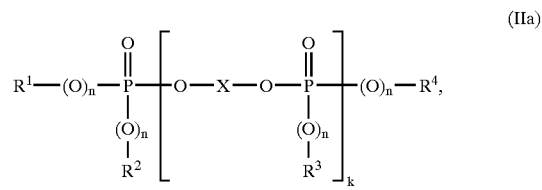

wherein $R^1$, $R^2$, $R^3$ and $R^4$ are each independently of the others optionally halogenated $C_1$- to $C_8$-alkyl, or $C_5$- to $C_6$-cycloalkyl, $C_6$- to $C_{20}$aryl or $C_7$- to $C_{12}$-aralkyl each optionally substituted by alkyl, preferably $C_1$–$C_4$-alkyl, and/or by halogen, preferably chlorine, bromine, the substituents n are each independently of the others 0 or 1, k represents from 0 to 30, and X represents a mono- or poly-nuclear aromatic radical having from 6 to 30 carbon atoms,

wherein

R$^1$ and R$^6$ are each independently of the other optionally halogenated C$_1$–C$_{24}$-alkyl, or C$_5$–C$_6$-cycloalkyl, C$_6$–C$_{20}$-aryl or C$_7$–C$_{12}$-allyl each optionally substituted by halogen and/or by C$_1$–C$_{10}$-alkyl, or R$^5$ and R$^6$ in the case of formula (IId) form an alkyl chain, preferably having up to 6, especially 2 or 3, carbon atoms, Me represents a metal selected from main group 1 to 3 and subsidiary groups VIII, 1B and 2B of the periodic system, and q is determined by the valency of the metal ion, and, optionally, impact strength modifiers.

The composition according to the invention contains preferably from 0.1 to 30 parts by weight, especially from 1 to 25 parts by weight, very especially from 2 to 20 parts by weight, of phosphonate amine and preferably from 0.5 to 20 parts by weight, especially from 1 to 18 parts by weight, more especially from 2 to 15 parts by weight, of phosphorus compound, the indicated amounts being based on the total mixture.

The compositions preferably contain graft polymer and, optionally, vinyl (co)polymer and/or polyalkylene terephthalate as the impact strength modifier.

The invention preferably provides blends containing

A) from 40 to 99 parts by weight, preferably from 60 to 98.5 parts by weight, of aromatic polycarbonate and/or polyester carbonate,
B) from 0.5 to 60 parts by weight, preferably from 1 to 40 parts by weight, especially from 2 to 25 parts by weight, of graft polymer of
B.1) from 5 to 95 wt. %, preferably from 30 to 80 wt. %, of one or more vinyl monomers on
B.2) from 95 to 5 wt %, preferably from 20 to 70 wt. %, of one or more graft bases having a glass transition temperature <10° C., preferably <0° C., especially <–20° C.,
C) from 0 to 45 parts by weight, preferably from 0 to 30 parts by weight, especially from 2 to 25 parts by weight, of at least one thermoplastic polymer selected from the group of the vinyl (co)polymers and polyalkylene terephthalates,
D) from 0.1 to 30 parts by weight, preferably from 1 to 25 parts by weight, especially from 2 to 20 parts by weight, of phosphonate amine of formula (I) described above,
E) from 0.5 to 20 parts by weight, preferably from 1 to 18 parts by weight, especially from 2 to 15 parts by weight, selected from at least one phosphorus compound of formulae (IIa), (IIb), (IIc) and (IId) described above,
F) from 0 to 5 parts by weight, preferably from 0.1 to 3 parts by weight, especially from 0.1 to 1 part by weight, more especially from 0.1 to 0.5 part by weight, of fluorinated polyolefin, the sum of the parts by weight of the components being 100.

Component

Aromatic polycarbonates and/or aromatic polyester carbonates which are suitable according to the invention as component A are known in the literature or can be prepared by processes which are known in the literature (for the preparation of aromatic polycarbonates see, for example, Schnell, "Chemistry and Physics of Polycarbonates", Interscience Publishers, 1964 and DE-AS 1 495 626, DE-OS 2 232 877, DE-OS 2 703 376, DE-OS 2 714 544, DE-OS 3 000 610, DE-OS 3 832 396; for the preparation of aromatic polyester carbonates see, for example, DE-OS 3 077 934).

The preparation of aromatic polycarbonates is carried out, for example, by reacting diphenols with carbonic acid halides, preferably phosgene, and/or with aromatic dicarboxylic acid dihalides, preferably benzenedicarboxylic acid dihalides, by the phase boundary process, optionally using chain terminators, for example monophenols, and optionally using branching agents having a functionality of three or more, for example triphenols or tetraphenols.

Diphenols for the preparation of aromatic polycarbonates and/or aromatic polyester carbonates are preferably those of formula (III)

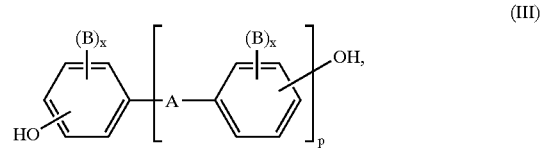

(III)

wherein

A represents a single bond, C$_1$–C$_5$-alkylene, C$_2$–C$_5$-alkylidene, C$_5$–C$_6$-cycloalkylidene, —O—, —SO—, —CO—, —S—, —SO$_2$—, C$_6$–C$_{12}$-arylene, to which there may be condensed other aromatic rings optionally containing hetero atoms.

or a radical of formula (IV) or (V)

(IV)

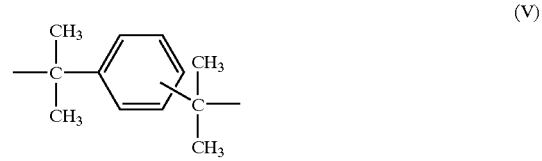

(V)

each of the substituents B represents C$_1$–C$_{12}$-alkyl, preferably methyl, halogen, preferably chlorine and/or bromine, the substituents x are each independently of the other 0, 1 or 2, p represents 1 or 0, and R$^7$ and R$^8$ can be selected individually for each X$^1$ and are each independently of the other hydrogen or C$_1$–C$_6$-alkyl, preferably hydrogen, methyl or ethyl, X$^1$ represents carbon, and m represents an integer from 4 to 7, preferably 4 or 5, with the proviso that at at least one atom X$^1$, R$^7$ and R$^8$ are simultaneously alkyl.

Preferred diphenols are hydroquinone, resorcinol, dihydroxydiphenols, bis-(hydroxyphenyl)-C$_1$–C$_5$-alkanes, bis(hydroxyphenyl)-C$_5$–C$_6$-cycloalkanes, bis-(hydroxyphenyl) ethers, bis-(hydroxyphenyl) sulfoxides, bis-(hydroxyphenyl) ketones, bis-(hydroxyphenyl)-sulfones and α,α-bis(hydroxyphenyl)-diisopropylbenzenes and their derivatives chlorinated and/or brominated at the ring.

Especially preferred diphenols are 4,4'-dihydroxydiphenyl, bisphenol A, 2,4-bis-(4-hydroxyphenyl)-2-methylbutane, 1,1-bis(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl-sulfone and their di- and tetrabrominated or -chlorinated derivatives, such as, for example, 2,2-bis-(3-chloro-4-hydroxyphenyl)-propane, 2,2-bis-(3,5-chloro-4-hydroxyphenyl)-propane or 2,2-bis-(3,5-dibromo-4-hydroxyphenyl)-propane.

Special preference is given to 2,2-bis-4-hydroxyphenyl)-propane (bisphenol A).

The diphenols may be used individually or in the form of any desired mixtures.

The diphenols are known in the literature or obtainable by processes known in the literature.

Suitable chain terminators for the preparation of thermoplastic aromatic polycarbonates are, for example, phenol, p-chlorophenol, p-tert.-butylphenol or 2,4,6-tribromophenol, as well as long-chained alkylphenols, such as 4-(1,3-tetramethylbutyl)-phenol according to DE-OS 2 842 005 or monoalkylphenols or dialkylphenols having a total of from 8 to 20 carbon atoms in the alkyl substituents, such as 3,5-di-tert.-butylphenol, p-isooctylphenol, p-tert.octylphenol, p-dodecylphenol and 2-(3,5-dimethylheptyl)-phenol and 4-(3,5-dimethylheptyl)-phenol. The amount of chain terminators to be used is generally from 0.5 mol % to 10 mol %, based on the molar sum of the diphenols used in a particular case.

The thermoplastic aromatic polycarbonates have mean weight-average molecular weights ($M_w$, measured, for example, by means of an ultracentrifuge or by scattered-light measurement) of from 10,000 to 200,000, preferably from 20,000 to 80,000.

The thermoplastic aromatic polycarbonates may be branched in a known manner, preferably by the incorporation of from 0.05 to 2.0 mol %, based on the sum of the diphenols used, of compounds having a functionality of three or more, for example compounds having three or more phenolic groups.

Both homopolycarbonates and copolycarbonates are suitable. For the preparation of copolycarbonates according to the invention as component A), from 1 to 25 wt. %, preferably from 2.5 to 25 wt. % (based on the total amount of diphenols to be used) of polydiorganosiloxanes having hydroxy-aryloxy terminal groups may also be used. Those compounds are known (see, for example, U.S. Pat. No. 3,419,634) or can be prepared by processes known in the literature. The preparation of copolycarbonates containing polydiorganosiloxanes is described, for example, in DE-OS 3 334 782.

In addition to the homopolycarbonates of bisphenol A, preferred polycarbonates are the copolycarbonates of bisphenol A containing up to 15 mol %, based on the molar sum of diphenols, of diphenols other than those mentioned as being preferred or especially preferred, especially 2,2-bis-(3,5-dibromo-4-hydroxyphenyl)-propane.

Aromatic dicarboxylic acid dihalides for the preparation of aromatic polyester carbonates are preferably the diacid dichlorides of isophthalic acid, terephthalic acid, diphenyl ether 4,4'-dicarboxylic acid and naphthalene-2,6-dicarboxylic acid. Special preference is given to mixtures of the diacid dichlorides of isophthalic acid and terephthalic acid in a ratio of from 1:20 to 20:1.

In the preparation of polyester carbonates, a carbonic acid halide, preferably phosgene, is additionally used concomitantly as bifunctional acid derivative.

In addition to the monophenols already mentioned, there come into consideration as chain terminators for the preparation of the aromatic polyester carbonates also the chlorocarbonic acid esters of the mentioned monophenols and the acid chlorides of aromatic monocarboxylic acids, which may optionally be substituted by $C_1$–$C_{22}$-alkyl groups or by halogen atoms, as well as aliphatic $C_2$–$C_{22}$-monocarboxylic acid chlorides.

The amount of chain terminators is in each case from 0.1 to 10 mol %, based in the case of phenolic chain terminators on moles of diphenols and in the case of monocarboxylic acid chloride chain terminators on moles of dicarboxylic acid dichlorides.

The aromatic polyester carbonates may also contain aromatic hydroxycarboxylic acids incorporated therein.

The aromatic polyester carbonates may be either linear or branched in a known manner (see in that connection also DE-OS 2 940 024 and DE-OS 3 007 934).

There may be used as branching agents, for example, carboxylic acid chlorides having a functionality of three or more, such as trimesic acid trichloride, cyanuric acid trichloride, 3,3'-4,4'-benzophenone-tetracarboxylic acid tetrachloride, 1,4,5,8-naphthalenetetracarboxylic acid tetrachloride or pyromellitic acid tetrachloride, in amounts of from 0.01 to 1.0 mol % (based on dicarboxylic acid dichlorides used), or phenols having a functionality of three or more, such as phloroglucinol, 4,6-dimethyl-2,4,6-tri-(4-hydroxyphenyl)-heptene-2,4,4-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxyphenyl)-cyclohexyl]-propane, 2,4-bis(4-hydroxyphenyl-isopropyl)-phenol, tetra-(4-hydroxyphenyl)-methane, 2,6-bis-(2-hydroxy-5-methyl-benzyl-4-methylphenol, 2-(4-hydroxyphenyl)-2-(2,4-dihydroxyphenyl)propane, tetra-(4-[4-hydroxyphenyl-isopropyl]-phenoxy)-methane, 1,4-bis-[4,4'-dihydroxytriphenyl)methyl]-benzene, in amounts of from 0.01 to 1.0 mol %, based on diphenols used. Phenolic branching agents can be used initially with the diphenols, acid chloride branching agents can be introduced together with the acid dichlorides.

The content of carbonate structural units in the thermoplastic aromatic polyester carbonates can vary as desired. The carbonate group content is preferably up to 100 mol %, especially up to 80 mol %, more especially up to 50 mol %, based on the sum of ester groups and carbonate groups. Both the esters and the carbonates contained in the aromatic polyester carbonates can be present in the polycondensation product in the form of blocks or in a randomly distributed manner.

The relative solution viscosity ($\eta_{rel}$) of the aromatic polycarbonates and polyester carbonates is in the range of from 1.18 to 1.4, preferably from 1.22 to 1.3 (measured on solutions of 0.5 g of polycarbonate or polyester carbonate in 100 ml of methylene chloride solution at 25° C.).

The thermoplastic aromatic polycarbonates and polyester carbonates may be used alone or in any desired mixture with one another.

Component B

Component B consists of one or more graft polymers of

B.1 from 5 to 95 wt. %, preferably from 30 to 80 wt. %, of at least one vinyl monomer with B.2 from 95 to 5 wt. %, preferably from 70 to 20 wt. %, of one or more graft bases having glass transition temperatures <10° C., preferably <0° C., especially <−20° C.

The graft base B.2 generally has a mean particle size ($d_{50}$ value) of from 0.05 to 5 μm, preferably from 0.10 to 0.5 μm, especially from 0.20 to 0.40 μm.

Monomers B.1 are preferably mixtures of

B.1.1 from 50 to 99 parts by weight of vinyl aromatic compounds and/or vinyl aromatic compounds substituted at the ring (such as, for example, styrene, α-methylstyrene, p-methylstyrene, p-chlorostyrene) and/or methacrylic acid ($C_1$–$C_4$)-alkyl esters (such as, for example, methyl methacrylate, ethyl methacrylate) and B.1.2 from 1 to 50 parts by weight of vinyl cyanides (unsaturated nitrites such as acrylonitrile and methacrylonitrile) and/or (meth)acrylic acid ($C_1$–$C_8$)-alkyl esters (such as, for example, methyl methacrylate, n-butyl acrylate, tert.-butyl acrylate) and/or derivatives (such as anhydrides and imides) of unsaturated carboxylic acids (for example maleic anhydride and N-phenyl maleimide).

Preferred monomers B.1.1 are selected from at least one of the monomers styrene, α-methylstyrene and methyl methacrylate; preferred monomers B.1.2 are selected from at least one of the monomers acrylonitrile, maleic anhydride and methyl methacrylate.

Especially preferred monomers are B.1.1 styrene and B.1.2 acrylonitrile.

Suitable graft bases B.2 for the graft polymers B are, for example, diene rubbers, EP(D)M rubbers, that is to say those based on ethylene/propylene and optionally diene, acrylate, polyurethane, silicone, chloroprene and ethylene/vinyl acetate rubbers.

Preferred graft bases B.2 are diene rubbers (for example based on butadiene, isoprene, etc.) or mixtures of diene rubbers or copolymers of diene rubbers or mixtures thereof with other copolymerisable monomers (for example according to B.1.1 and B.1.2), with the proviso that the glass transition temperature of component B.2 is below <10° C., preferably <0° C., especially <−10° C.

Special preference is given to pure polybutadiene rubber.

Especially preferred polymers B are, for example, ABS polymers (emulsion, mass and suspension ABS), as are described, for example, in DE-OS 2 035 390 (=U.S. Pat. No. 3,644,574) or in DE-OS 2 248 242 (=GB-B 1 409 275) or in Ullmanns Enzyklopädie der Technischen Chemie, Vol. 19 (1980), p. 280 et seq. The gel content of the graft base B.2 is at least 30 wt. %, preferably at least 40 wt. % (measured in toluene).

The graft copolymers B are prepared by free-radical polymerisation, for example by emulsion, suspension, solution or mass polymerisation, preferably by emulsion polymerisation.

Especially suitable graft rubbers are also ABS polymers prepared by redox initiation using an initiator system of organic hydroperoxide and ascorbic acid according to U.S. Pat. No. 4,937,285.

Since it is known that the graft monomers are not necessarily grafted on to the graft base completely in the graft reaction, graft polymers B are also to be understood according to the invention as being products that are obtained by (co)polymerisation of the graft monomers in the presence of the graft base and that are also obtained during working up.

Suitable acrylate rubbers according to B.2 for the polymers B are preferably polymers of acrylic acid alkyl esters, optionally with up to 40 wt. %, based on B.2, of other polymerisable, ethylenically unsaturated monomers. The preferred polymerisable acrylic acid esters include $C_1$–$C_8$-alkyl esters, for example methyl, ethyl, butyl, n-octyl and 2-ethylhexyl esters; haloalkyl esters, preferably halo-$C_1$–$C_8$-alkyl esters, such as chloroethyl acrylate, as well as mixtures of those monomers.

For crosslinking, monomers having more than one polymerisable double bond can be copolymerised. Preferred examples of crosslinking monomers are esters of unsaturated monocarboxylic acids having from 3 to 8 carbon atoms and of unsaturated monohydric alcohols having from 3 to 12 carbon atoms, or of saturated polyols having from 2 to 4 OH groups and from 2 to 20 carbon atoms, such as, for example, ethylene glycol dimethacrylate, allyl methacrylate; polyunsaturated heterocyclic compounds, such as, for example, trivinyl and triallyl cyanurate; polyfunctional vinyl compounds, such as di- and tri-vinylbenzenes; and also triallyl phosphate and diallyl phthalate.

Preferred crosslinking monomers are allyl methacrylate, ethylene glycol dimethacrylate, diallyl phthalate and heterocyclic compounds having at least three ethylenically unsaturated groups.

Especially preferred crosslinking monomers are the cyclic monomers triallyl cyanurate, triallyl isocyanurate, triacryloylhexahydro-s-triazine, triallyl benzenes. The amount of crosslinking monomers is preferably from 0.02 to 5 wt. %, especially from 0.05 to 2 wt. %, based on the graft base B.2.

In the case of cyclic crosslinking monomers having at least three ethylenically unsaturated groups, it is advantageous to limit the amount to less than 1 wt. % of the graft base B.2.

Preferred "other" polymerisable, ethylenically unsaturated monomers which can optionally be used, in addition to the acrylic acid esters, for the preparation of the graft base B.2 are, for example, acrylonitrile, styrene, α-methylstyrene, acrylamides, vinyl $C_1$–$C_6$-alkyl ethers, methyl methacrylate, butadiene. Preferred acrylate rubbers as graft base B.2 are emulsion polymers having a gel content of at least 60 wt. %.

Other suitable graft bases according to B.2 are silicone rubbers having graft-active sites, as are described in DE-OS 3 704 657, DE-OS 3 704 655, DE-OS 3 631 540 and DE-OS 3 631 539.

The gel content of the graft base B.2 is determined at 25° C. in a suitable solvent (M. Hoffmann, H. Krömer, R. Kuhn, Polymeranalytik I und II, Georg Thieme-Verlag, Stuttgart 1977).

The mean particle size $d_{50}$ is the diameter above and below which in each case 50 wt. % of the particles lie. It can be determined by means of ultracentrifuge measurement (W. Scholtan, H. Lange, Kolloid, Z. und Z. Polymere 250 (1972), 782–796).

Component C

Component C consists of one or more thermoplastic vinyl (co)polymers C.1 and/or polyalkylene terephthalates C.2.

Suitable as vinyl (co)polymers C.1 are polymers of at least one monomer from the group of the vinyl aromatic compounds, vinyl cyanides (unsaturated nitriles), (meth) acrylic acid ($C_1$–$C_8$)-alkyl esters, unsaturated carboxylic acids and derivatives (such as anhydrides and imides) of unsaturated carboxylic acids. Especially suitable are (co) polymers of C.1.1 from 50 to 99 parts by weight, preferably from 60 to 80 parts by weight, of vinyl aromatic compounds and/or vinyl aromatic compounds substituted at the ring (such as, for example, styrene, α-methylstyrene, p-methylstyrene, p-chlorostyrene) and/or methacrylic acid ($C_1$–$C_8$-alkyl esters (such as, for example, methyl methacrylate, ethyl methacrylate), C.1.2 from 1 to 50 parts by weight, preferably from 20 to 40 parts by weight, of vinyl cyanides (unsaturated nitriles), such as acrylonitrile and methacrylonitrile, and/or (meth) acrylic acid ($C_1$–$C_8$-alkyl esters (such as, for example, methyl methacrylate, n-butyl acrylate, tert.-butyl acrylate) and/or unsaturated carboxylic acids (such as maleic acid)

and/or derivatives (such as anhydrides and imides) of unsaturated carboxylic acids (for example maleic anhydride and N-phenyl maleimide).

The (co)polymers C.1 are resin-like, thermoplastic and rubber-free.

Special preference is given to the copolymer of C.1.1 styrene and C.1.2 acrylonitrile.

The (co)polymers according to C.1 are known and can be prepared by free-radical polymerisation, especially by emulsion, suspension, solution or mass polymerisation. The (co)polymers preferably have molecular weights $\overline{M}_w$ (weight average, determined by light scattering or sedimentation) of from 15,000 to 200,000.

The polyalkylene terephthalates of component C.2 are reaction products of aromatic dicarboxylic acids or reactive derivatives thereof, such as dimethyl esters or anhydrides, and aliphatic, cycloaliphatic or araliphatic diols, and mixtures of those reaction products.

Preferred polyalkylene terephthalates contain at least 80 wt. %, preferably at least 90 wt. %, based on the dicarboxylic acid component, of terephthalic acid radicals and at least 80 wt. %, preferably at least 90 mol %, based on the diol component, of ethylene glycol and/or 1,4-butanediol radicals.

The preferred polyalkylene terephthalates may contain, in addition to terephthalic acid radicals, up to 20 mol %, preferably up to 10 mol %, of radicals of other aromatic or cycloaliphatic dicarboxylic acids having from 8 to 14 carbon atoms or of aliphatic dicarboxylic acids having from 4 to 12 carbon atoms, such as, for example, radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexane-diacetic acid.

The preferred polyalkylene terephthalates may contain, in addition to ethylene glycol or 1,4-butanediol radicals, up to 20 mol %, preferably up to 10 mol %, of other aliphatic diols having from 3 to 12 carbon atoms or cycloaliphatic diols having from 6 to 21 carbon atoms, for example radicals of 1,3-propanediol, 2-ethyl-1,3-propanediol, neopentyl glycol, 1,5-pentanediol, 1,6-hexanediol, 1,4-cyclohexanedimethanol, 3-ethyl-2,4-pentanediol, 2-methyl-2,4-pentanediol, 2,2,4-trimethyl-1,3-pentanediol, 2-ethyl-1,3-hexanediol, 2,2-diethyl-1,3-propanediol, 2,5-hexanediol, 1,4-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(4-β-hydroxyethoxyphenyl)-propane and 2,2-bis-(4-hydroxypropoxyphenyl)-propane (DE-OS 2 407 674, 2 407 776, 2 715 932).

The polyalkylene terephthalates can be branched by the incorporation of relatively, small amounts of tri- or tetra-hydric alcohols or tri- or tetra-basic carboxylic acids, for example according to DEOS 1 900 270 and U.S. Pat. No. 3 692 744. Examples of preferred branching agents are trimesic acid, trimellitic acid, trimethylolethane, trimethylolpropane and pentaerythritol.

Special preference is given to polyalkylene terephthalates which have been prepared solely from terephthalic acid and reactive derivatives thereof (for example dialkyl esters thereof) and ethylene glycol and/or 1,4-butanediol, and mixtures of those polyalkylene terephthalates.

Mixtures of polyalkylene terephthalates contain from 1 to 50 wt. %, preferably from 1 to 30 wt. %, of polyethylene terephthalate and from 50 to 99 wt. %, preferably from 70 to 99 wt. %, of polybutylene terephthalate.

The polyalkylene terephthalates which are preferably used generally have an intrinsic viscosity of from 0.4 to 1.5 dl/g, preferably from 0.5 to 1.2 dl/g, measured in phenol/o-dichlorobenzene (1:1 parts by weight) at 25° C. using an Ubbelohde viscometer.

The polyalkylene terephthalates can be prepared by known methods (see, for example, Kunststoff-Handbuch, Volume VIII, p. 695 et seq., Carl-Hanser-Verlag, Munich 1973).

Component D

The moulding compositions according to the invention contain as flameproofing agent at least one phosphonate amine compound of formula (I)

in which

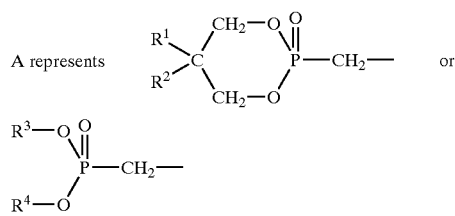

wherein $R^1$, $R^2$, $R^3$ and $R^4$ and B and y are as defined above.

The substituents B, each independently, are preferably hydrogen; ethyl, n-propyl or isopropyl, each of which may be substituted by halogen; $C_6$–$C_{10}$-aryl, especially phenyl or naphthyl, which is unsubstituted or substituted by $C_1$–$C_4$-alkyl and/or by halogen.

Alkyl in $R^1$, $R^2$, $R^3$ and $R^4$, each independently of the others, is preferably methyl, ethyl, n-propyl, isopropyl, n-butyl, isobutyl, sec.-butyl, tert.-butyl, pentyl or hexyl.

Substituted alkyl in $R^1$, $R^2$, $R^3$ and $R^4$, each independently of the others, is preferably $C_1$–$C_{10}$-alkyl substituted by halogen, especially mono- or di-substituted methyl, ethyl, n-propyl, isopropyl, n-butyl, isobutyl, sec.-butyl, tert.-butyl, pentyl or hexyl.

$R^3$ and $R^4$, together with the carbon atom to which they are bonded, preferably form cyclopentyl, cyclohexyl, cycloheptyl or cyclooctyl, especially cyclopentyl or cyclohexyl.

$C_6$–$C_{10}$-Aryl in $R^1$, $R^2$, $R^3$ and $R^4$, each independently of the others, is preferably phenyl, naphthyl or binaphthyl, especially o-phenyl, o-naphthyl, o-binaphthyl, each of which may be substituted (generally mono-, di- or tri-substituted) by halogen.

The following are mentioned by way of preferred examples: 5,5,5',5',5",5"-hexamethyl-tris(1,3,2-dioxaphosphorinane-methane)amin-2,2',2"-trioxide of formula (I-1)

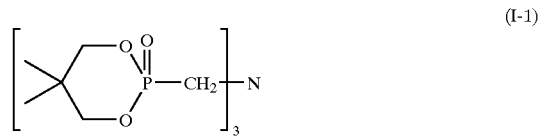

(test product XPM 1000, Solutia Inc., St Louis, USA) 1,3,2-dioxaphosphorinane-2-methaneamine, N-butyl-N[(5,5-dimethyl-1,3,2-dioxaphosphorinan-2-yl)methyl]-5,5-dimethyl-, P,2-dioxide; 1,3,2-dioxaphosphorinane-2-methaneamine, N-[(5,5-dimethyl-1,3,2-dioxaphosphorinan-2-yl)methyl]-5,5-dimethyl-N-phenyl-, P,2-dioxide; 1,3,2- dioxaphosphorinane-2-methaneamine, N,N-dibutyl-5,5-dimethyl-, 2-oxide, 1,3,2-dioxaphosphorinane-2-methaneamine, N-((5,5-dimethyl-1,3,2-dioxaphosphorinan-2-yl)methyl]-N-ethyl-5,5-dimethyl-, P,2-dioxide, 1,3,2-dioxaphosphorinane-2-methaneamine, N-butyl-N-[(5,5-dichloromethyl-1,3,2-dioxaphosphorinan-2-yl)methyl]-5,5-di-chloromethyl-, P,2-dioxide, 1,3,2-dioxaphosphorinane-2-methaneamine, N-[(5,5-di-chloromethyl-1,3,2-dioxaphosphorinan-2-yl)methyl]-5,5-dichloromethyl-N-phenyl-, P,2-dioxide; 1,3,2-dioxaphosphorinane-2-methaneamine, N,N-di-(4-chlorobutyl)-5,5-dimethyl-2-oxide; 1,3,2-dioxaphosphorinane-2-methaneamine, N-[(5,5-dimethyl-1,3,2-dioxaphosphorinan-2-yl)-methane]-N-(2-chloroethyl)-5,5-di(chloromethyl), P,2-dioxide.

Also preferred are:
compounds of formula (I-2) or (I-3)

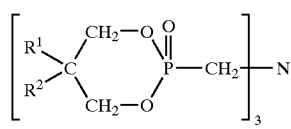

(I-2)

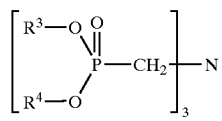

(I-3)

wherein
$R^1$, $R^2$, $R^3$ and $R^4$ are as defined above.

Compounds of formulae (I-2), (I-1) are especially preferred. The individual compounds mentioned above are also especially preferred.

The compounds of formula (I) can be prepared by the following processes:

a) $PCl_3$ is added to a mixture of 1,3-diol derivatives, water and an organic solvent at a temperature of from 10 to 60° C., yielding a 5,5-disubstituted 1,3,2-dioxaphosphorinane 2-oxide of formula (Ia)

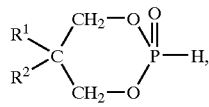

(Ia)

wherein $R^1$ and $R^2$ are as defined above;
b) after purification, the 1,3,2-dioxaphosphorinane 2-oxide is reacted in paraformaldehyde with an amine $B_yNH_{3-y}$, wherein B and y are as defined above;
c) after further purification and drying, the phosphonate amine of formula (I) is obtained.

A detailed description of the preparation process can be found in U.S. Pat. No. 5,844.028.

Component E

Component E consists of one or more phosphorus compounds or a mixture of at least one monomeric and at least one oligomeric phosphorus compound of formulae (IIa), (IIb), (IIc) and (IId) mentioned above.

In formula (IIa), $R^1$, $R^2$, $R^3$ and $R^4$ are as defined above. Preferably, $R^1$, $R^2$, $R^3$ and $R^4$ are each independently of the others $C_1$–$C_4$-alkyl, phenyl, naphthyl or phenyl-$C_1$–$C_4$-alkyl. The aromatic groups $R^1$, $R^2$, $R^3$ and $R^4$ may in turn be substituted by halogen and/or alkyl groups, preferably chlorine, bromine and/or $C_1$–$C_4$-alkyl. Especially preferred aryl radicals are cresyl, phenyl, xylenyl, propylphenyl or butylphenyl and the corresponding brominated and chlorinated derivatives thereof.

X in formula (IIa) represents a mono- or poly-nuclear aromatic radical having from 6 to 30 carbon atoms. It is preferably derived from diphenols of formula (III), such as, for example, diphenylphenol, bisphenol A, or from resorcinol or hydroquinone or their chlorinated or brominated derivatives.

each of the substituents n in formula (IIa), independently of the others, may be 0 or 1; n is preferably 1.

k represents values from 0 to 30, preferably an average value of from 0.3 to 20, especially from 0.5 to 10, more especially from 0.5 to 6.

There are used as component E according to the invention especially mixtures of preferably from 10 to 90 wt. %, preferably from 12 to 40 wt. %, of at least one monophosphorus compound and at least one oligomeric phosphorus compound of formula (IIa) or of a mixture of oligomeric phosphorus compounds in amounts of from 10 to 90 wt. %, preferably from 60 to 88 wt. %, based on the total amount of phosphorus compounds.

Monophosphorus compounds of formula (IIa) are especially tributyl phosphate, tris-(2-chloroethyl) phosphate, tris-(2,3-dibromopropyl) phosphate, triphenyl phosphate, tricresyl phosphate, diphenylcresyl phosphate, diphenyloctyl phosphate, diphenyl-2-ethylcresyl phosphate, tri-(isopropylphenyl) phosphate, halo-substituted aryl phosphates, methylphosphonic acid dimethyl esters, methylphosphonic acid diphenyl esters, phenylphosphonic acid diethyl esters, triphenylphosphine oxide or tricresylphosphine oxide.

The mixtures of monomeric and oligomeric phosphorus compounds of formula (I) have average k values of from 0.3 to 20, preferably from 0.5 to 10, especially from 0.5 to 6.

The phosphorus compounds of component E are known (see, for example, EP-A 363 608, EP-A 640 655) or can be prepared according to known methods in an analogous manner (for example, Ullmanns Encyklopädie der technischen Chemie, Vol. 18, p. 301 et seq. 1979; Houben-Weyl, Methoden der organischen Chemie, Vol. 12/1, p. 43; Beilstein Vol. 6, p. 177).

The moulding compositions according to the invention may contain as phosphorus compounds metal compounds of monoesters of phosphoric acid of formula (IIb) and/or (IIc)

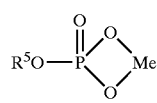

(IIb)

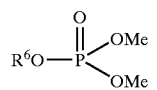

(IIc)

or metal compounds of diesters phosphoric acid according to formula (IId)

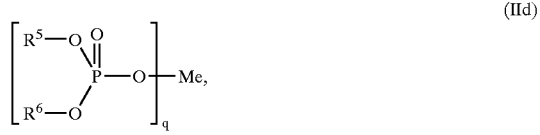

(IId)

wherein $R^5$ and $R^6$, Me and q are as defined above.

$R^5$ and $R^6$ are each independently of the other preferably optionally halogenated (preferably by chlorine and/or bromine) $C_1$–$C_{15}$-alkyl, especially $C_1$–$C_{10}$-alkyl, or cyclopentyl, cyclohexyl, phenyl, naphthyl or phenyl-$C_1$–$C_4$-alkyl (such as benzyl) each optionally substituted by halogen (preferably chlorine and/or bromine) and/or by $C_1$–$C_6$-alkyl, especially $C_1$–$C_4$-alkyl, especially methyl, ethyl, n-propyl or isopropyl.

$R^5$ and $R^6$ are each independently of the other especially cresyl, phenyl, xylenyl, propylphenyl or butylphenyl and the corresponding brominated and chlorinated derivatives thereof.

Suitable metals Me are main groups 1 to 3 and subsidiary groups VIII, IB and IIB of the periodic system (according to Mendeleyev), with metals from main groups 2 and 3 and from subsidiary group II being preferred.

Special preference is given to the compounds of the metals Mg, Ca, Ba, boron, Al and Zn.

Suitable processes for the preparation of the metal compounds according to the invention of phosphoric acid esters are processes known in the literature, such as, for example, the transesterification process starting from triesters of phosphoric acid, or the acid halide process starting from phosphoryl chloride (EP-A 0 801 116; J. Org. Chem. 1978, Vol. 43, No. 1, p. 24–31).

In the preparation of the phosphoric acid esters according to the invention, the inorganic reaction components are preferably used in very finely divided form. The average particle diameters are $\leq 1$ μm, preferably $\leq 200$ nm.

Component F

The fluorinated polyolefins F have a high molecular weight and have glass transition temperatures above $-30°$ C., generally above $100°$ C., fluorine contents of preferably from 65 to 76 wt. %, especially from 70 to 76 wt. %, and mean particle diameters $d_{50}$ of from 0.05 to 1000 μm, preferably from 0.08 to 20 μm. In general, the fluorinated polyolefins F have a density of from 1.2 to 2.3 g/cm$^3$. Preferred fluorinated polyolefins F are polytetrafluoroethylene, polyvinylidene fluoride, tetrafluoroethylene/hexafluoropropylene and ethylene/tetrafluoroethylene copolymers. The fluorinated polyolefins are known (see "Vinyl and Related Polymers" by Schildknecht, John Wiley & Sons, Inc., New York, 1962, pages 484–494; "Fluorpolymers" by Wall, Wiley-Interscience, John Wiley & Sons, Inc., New York, Volume 13, 1970, pages 623–654; "Modern Plastics Encyclopedia", 1970–1971, Volume 47, No. 10 A, October 1970, McGraw-Hill, Inc., New York, pages 134 and 774; "Modern Plastics Encyclopedia", 1975–1976, October 1975, Volume 52, No. 10 A, McGraw-Hill, Inc., New York, pages 27, 28 and 472; and U.S. Pat. No. 3,671,487, 3,723,373 and 3,838,092).

They can be prepared by known processes, for example by polymerisation of tetrafluoroethylene in an aqueous medium with a catalyst that forms free radicals, for example sodium, potassium or ammonium peroxodisulfate, at pressures of from 7 to 71 kg/cm$^2$ and at temperatures of from 0 to $200°$ C., preferably at temperatures of from 20 to $100°$ C. (For further details see, for example, U.S. Pat. No. 2,393,967.) Depending on the form in which they are used, the density of those materials may be from 1.2 to 2.3 g/cm$^3$ and the mean particle size may be from 0.5 to 1000 μm.

Preferred fluorinated polyolefins F according to the invention are tetrafluoroethylene polymers having a mean particle diameter of from 0.05 to 20 μm, preferably from 0.08 to 10 μm, and a density of from 1.2 to 1.9 g/cm$^3$ and are preferably used in the form of a coagulated mixture of emulsions of the tetrafluoroethylene polymers F with emulsions of the graft polymers B.

Other preparations which are preferred according to the invention are the fluorinated polyolefins F:

F.1) in the form of a coagulated mixture with at least one of components A to C, the fluorinated polyolefin F or polyolefin mixture being mixed in the form of an emulsion with at least one emulsion of components A to C and subsequently being coagulated;

F.2) in the form of a pre-compound with at least one of components A to C, the fluorinated polyolefins F being mixed in the form of a powder with a powder or a granulate of at least one of components A to C and being compounded in the melt, generally at temperatures of from $208°$ C. to $330°$ C., in conventional devices such as kneaders, extruders or double-shaft screws.

Preferred preparations for the fluorinated polyolefins F are coagulated mixtures with a graft polymer B or a vinyl (co)polymer C.

Suitable fluorinated polyolefins F which can be used in powder form are tetrafluoroethylene polymers having a mean particle diameter of from 100 to 1000 μm and densities of from 2.0 g/cm$^3$ to 2.3 g/cm$^3$.

For the preparation of a coagulated mixture of B and F, an aqueous emulsion (latex) of a graft polymer B is first mixed with a finely divided emulsion of a tetrafluoroethylene polymer F; suitable tetrafluoroethylene polymer emulsions usually have solids contents of from 30 to 70 wt. %, especially from 50 to 60 wt. %, preferably from 30 to 35 wt. %.

The amount indicated in the description of component B can include the amount of graft polymer for the coagulated mixture of graft polymer and fluorinated polyolefin.

In the emulsion mixture, the equilibrium ratio of graft polymer B to tetrafluoroethylene polymer F is from 95:5 to 60:40. The emulsion mixture is subsequently coagulated in a known manner, for example by spray drying, lyophilisation or coagulation by the addition of inorganic or organic salts, acids, bases or organic, water-miscible solvents, such as alcohols, ketones, preferably at temperatures of from 20 to $150°$ C., especially from 50 to $100°$ C. If necessary, drying can be carried out at from 50 to $200°$ C., preferably from 70 to $100°$ C.

Suitable tetrafluoroethylene polymer emulsions are commercially available products and are sold, for example, by DuPont as Teflon® 30 N.

The moulding compositions according to the invention may contain at least one of the conventional additives, such as lubricating and mould-release agents, nucleating agents, antistatics, stabilisers as well as colourings and pigments.

The moulding compositions according to the invention may contain up to 35 wt %, based on the total moulding composition, of a further flameproofing agent optionally having a synergistic action. There are mentioned as examples of further flameproofing agents organic halogen compounds, such as decabromobisphenyl ether, tetrabromobisphenol, inorganic halogen compounds, such as ammonium bromide, nitrogen compounds, such as melamine, melamine-formaldehyde resins, inorganic hydroxide compounds, such as magnesium and aluminium hydroxide, inorganic compounds, such as antimony oxides, hydroxoantimonate, zirconium, oxide, zirconium hydroxide, molybdenum oxide, ammonium molybdate, zinc borate, ammonium borate, barium metsborate, talc, silicate, silicon dioxide and tin oxide as well as siloxane compounds.

The blends according to the invention containing components A to F and, optionally, other known additives, such as stabilisers, colourings, pigments, lubricating and mould-release agents, nucleating agents and antistatics, are prepared by mixing the constituents in question in a known manner and melt compounding and melt-extruding the mixture at temperatures of from 200° C. to 300° C. in conventional devices such as kneaders, extruders and double-shaft screws, component F preferably being used in the form of the coagulated mixture mentioned above.

The individual constituents may be mixed in a known manner either in succession or simultaneously, either at approximately 20° C. (room temperature) or at a higher temperature.

Accordingly, the invention also provides a process for producing the moulding compositions.

On account of their excellent flame resistance and joint line strength and their good mechanical properties, the blends according to the invention are suitable for the production of moulded bodies of any kind, especially those having increased requirements as regards fracture resistance.

The blends of the present invention can be used in the production of moulded bodies of any kind. In particular, moulded bodies can be produced by injection moulding. Examples of moulded bodies which can be produced are: casing parts of any kind, for example for domestic appliances such as juice extractors, coffee machines, mixers, for office equipment such as monitors, printers, copiers, or covering plates for the construction sector and parts for the motor vehicle sector. They can also be used in the field of electrical engineering because they have very good electrical properties.

The moulding compositions according to the invention can also be used, for example, for producing the following moulded bodies or mouldings:

parts for finishing the interior of track vehicles, hub caps, casings for electrical appliances containing small transformers, casings for devices for distributing and transmitting information, casings and coverings for medical purposes, massage devices and casings therefor, toy vehicles for children, flat prefabricated wall panels, casings for security devices, rear spoilers, heat-insulated transport containers, device for keeping or caring for small animals, mouldings for sanitary and bathroom fittings, grids for covering ventilation openings, mouldings for garden and tool sheds, casings for gardening tools.

Another form of processing is the production of moulded bodies by deep-drawing from previously prepared sheets or films.

Accordingly, the present invention relates also to the use of the moulding compositions according to the invention in the production of moulded bodies of any kind, preferably of those mentioned above, and to the moulded bodies produced from the moulding compositions according to the invention.

EXAMPLES

Component A

Linear polycarbonate based on bisphenol A having a relative solution viscosity of 1.252, measured in $CH_2Cl_2$ as solvent at 25° C. and at a concentration of 0.5 g/100 ml.

Component B

Graft polymer of 45 parts by weight of a copolymer of styrene and acrylonitrile in a ratio of 72:28 with 55 parts by weight of particulate, crosslinked polybutadiene rubber (mean particle diameter $d_{50}$=0.40 μm), prepared by emulsion polymerisation.

Component C

Styrene/acrylonitrile copolymer having a styrene/acrylonitrile weight ratio of 72:28 and an intrinsic viscosity of 0.55 dl/g (measurement in dimethylformamide at 20° C.).

Component D

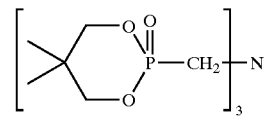

(XPM 1000 development product of Solutia Inc., St. Louis, USA)

Component E

E.1 Triphenyl phosphate, Disflamoll TP® from Bayer AG, Leverkusen, Germany
E.2 m-Phenylene-bis(diphenyl phosphate), Fyrolflex® from AKZO, Nobel Chemicals GmbH 52349 Düren, Germany.

Component F

Batch of SAN/Teflon in a weight ratio of 1:1, Blendex 446, General Electric, N.Y., USA.

Production and Testing of the Moulding Compositions According to the Invention The components are mixed using a 3 litre kneader. The moulded bodies are produced using an Arburg 270 E injection moulding machine at 260° C.

The dimensional stability under heat according to Vicat B is determined in accordance with DIN 53 460 (ISO 306) using rods measuring 80×10×4 mm.

In order to determine the joint line strength, the impact strength according to DIN 53 453 is measured at the joint line of test specimens injected at both sides (processing temperature 260° C.) measuring 170×10×4 mm.

The stress cracking behaviour (ESC behaviour) is tested on rods measuring 80×10×4 mm, processing temperature 260° C. The test medium used is a mixture of 60 vol. % toluene and 40 vol. % isopropanol. The test specimens are pre-expanded by means of a circular arc template (pre-extension in percent) and stored in the test medium at room temperature. The stress cracking behaviour is evaluated in the test medium via the crack formation or the fracture in dependence on the pre-extension.

The tensile modulus is determined according to DIN 53 457/ISO 527. The crude shade is assessed qualitatively by +/0/− (visual assessment).

The viscosity is measured according to DIN 58 811.

TABLE

Moulding compositions and their properties

| Example | 1 (comp.) | 2 |
|---|---|---|
| Component | | |
| A | 67.60 | 67.60 |
| B | 10.50 | 10.50 |
| C | 8.80 | 8.80 |
| D | 11.90 | 5.95 |
| E.1 and E.2 in a weight ratio of 1:3 | — | 5.95 |
| F | 0.8 | 0.8 |
| Mould-release agent | 0.4 | 0.4 |
| Properties: | | |
| UL 94 V 3.2 mm | V0 | V0 |
| Total after-burning time [s] | 5 | 1 |
| Modulus of elasticity [N/mm$^2$] | 2474 | 2554 |
| Melt viscosity 260° C./1000 s$^{-1}$ | 141.3 | 112.2 |
| Crude shade | 0 | + |
| $a_n$(joint line) $\left[\frac{kJ}{m^2}\right]$ | 6.4 | 6.7 |

What is claimed is:

1. Blends containing polycarbonate and/or polyester carbonate and from 0.1 to 30 parts by weight of phosphonate amine of formula (I)

$$A_{3-y}N-B_y \qquad (I)$$

in which

A represents a radical of formula (IIa)

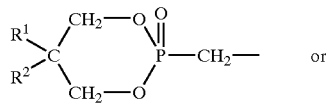
(IIa)

or

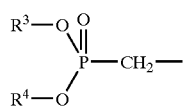
(IIb)

$R^1$ and $R^2$ are each independently of the other unsubstituted or substituted $C_1-C_{10}$-alkyl or unsubstituted or substituted $C_6-C_{10}$-aryl, $R^3$ and $R^4$ are each independently of the other unsubstituted or substituted $C_1-C_{10}$-alkyl or unsubstituted or substituted $C_6-C_{10}$-aryl, or $R^3$ and $R^4$ together represent unsubstituted or substituted $C_3-C_{10}$-alkylene, y represents the numerical values 0, 1 or 2, and substituents B are each independently hydrogen, optionally halogenated $C_2-C_8$-alkyl, unsubstituted or substituted $C_6-C_{10}$-aryl, and from 0.1 to 20 parts by weight of at least one phosphorus compound of the general formulae (IIa), (IIb), (IIc) and (IId)

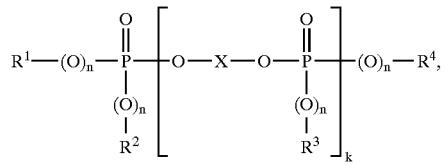
(IIa)

wherein $R^1$, $R^2$, $R^3$ and $R^4$ are each independently of the others optionally halogenated $C_1$- to $C_8$-alkyl, or $C_5$- to $C_6$-cycloalkyl, $C_6$- to $C_{20}$-aryl or $C_7$- to $C_{12}$-aralkyl each optionally substituted by alkyl and/or by halogen, the substituents n are each independently of the others 0 or 1, k represents from 0 to 30, and X represents a mono- or poly-nuclear aromatic radical having from 6 to 30 carbon atoms,

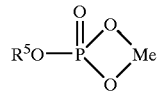
(IIb)

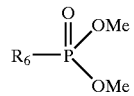
(IIc)

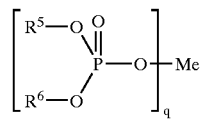
(IId)

wherein $R^5$ and $R^6$ are each independently of the other optionally halogenated $C_1-C_{24}$-alkyl, or $C_5-C_6$-cycloalkyl, $C_6-C_{20}$-aryl or $C_7-C_{12}$-aralkyl each optionally substituted by halogen and/or by $C_1-C_{10}$-alkyl, or $R^5$ and $R^6$ in the case of formula (IId) form an alkyl chain, Me represents a metal selected from main groups 1 to 3 and subsidiary groups VIII, 1B and 2B of the periodic system, and q is determined by the valency of the metal ion, and, optionally, impact strength modifiers, the indicated amounts being based on the total mixture.

2. Blends according to claim 1 containing from 0.1 to 30 parts by weight, based on the total mixture, of phosphonate amine and from 0.5 to 20 parts by weight of at least one phosphorus compound of formulae (IIa), (IIb), (IIc) and (IId).

3. Blends according to claim 1 further containing graft polymers as the impact strength modifiers.

4. Blends according to claim 1 wherein phosphonate amine is at least one member selected from the group consisting of 5,5,5',5',5",5"-hexamethyl-tris(1,3,2-dioxaphosphorinane-methane)amin-2,2',2"-trioxide, 1,3,2-dioxaphosphorinane-2-methaneamine, N-butyl-N-5,5-dimethyl-, P,2-dioxides; 1,3,2-dioxaphosphorinane-2-methaneamine, N-5,5-dimethyl-N-phenyl-, P,2-dioxide; 1,3, 2-dioxaphosphorinane-2-methaneamine, N,N-dibutyl-5,5-dimethyl-, 2-oxide, 1,3,2-dioxaphosphorinane-2-methaneimine, N-N-ethyl-5,5-dimethyl-, P,2-dioxide, 1,3,2- dioxaphosphorinane-2-methaneamine, N-butyl-N-5,5-dichloromethyl-, P,2-dioxide, 1,3,2-dioxaphosphorinane-2-methaneamine, N-5,5-dichloromethyl-N-phenyl-, P,2-dioxide; 1,3,2-dioxaphosphorinane-2-methaneamine, N,N-di-(4-chlorobutyl)-5,5-dimethyl-2-oxides; 1,3,2-dioxaphosphorinane-2-methaneimine and N-N-(2-chloroethyl)-5,5-di(chloromethyl), P,2-dioxide.

5. A thermoplastic molding composition comprising
A) 40 to 99 parts by weight of polycarbonate and/or polyester carbonate,
B) 0.5 to 60 parts by weight of graft polymer of
B.1) 5 to 95 wt. % of one or more vinyl monomers with
B.2) 95 to 5 wt. % of one or more graft bases having a glass transition temperature <10° C.,
C) 0 to 45 parts by weight of at least one thermoplastic polymer selected from the group of the vinyl (co) polymers and polyalkylene terephthalates,
D) 0.1 to 30 parts by weight of at least one component selected from the group consisting of phosphonate amines of formula (I) of claim 1,
E) 0.5 to 20 parts by weight of at least one phosphorus compound selected from the group consisting of formulae (IIa), (IIb), (IIc) and (IId), $$R^1-(O)_n-\underset{\underset{R^2}{(O)_n}}{\overset{O}{\underset{\|}{P}}}-\left[O-X-O-\underset{\underset{R^3}{(O)_n}}{\overset{O}{\underset{\|}{P}}}-(O)_n-R^4\right]_k \quad \text{(IIa)}$$

wherein
$R^1$, $R^2$, $R^3$ and $R^4$ are each independently of the others optionally halogenated $C_1$- to $C_8$-alkyl, or $C_5$- to $C_6$-cycloalkyl, $C_6$- to $C_{20}$-aryl or $C_7$- to $C_{12}$-aralkyl each optionally substituted by alkyl and/or by halogen,
the substituents n are each independently of the others 0 or 1,
k is 0 to 30, and
X is a mono- or poly-nuclear aromatic radical having 6 to 30 carbon atoms, $$R^5O-\underset{O}{\overset{O}{\underset{\|}{P}}}\begin{array}{c}O\\ \diagdown\\ \diagup\\ O\end{array}Me \quad \text{(IIb)}$$

$$R_6-\underset{OMe}{\overset{O}{\underset{\|}{P}}}-OMe \quad \text{(IIc)}$$

$$\left[\begin{array}{c}R^5-O\\ R^6-O\end{array}\underset{}{\overset{O}{\underset{\diagup}{P}}}-O\right]_q Me \quad \text{(IId)}$$

wherein
$R^5$ and $R^6$ are each independently of the other optionally halogenated $C_1$–$C_{24}$-alkyl, or $C_5$–$C_6$-cycloalkyl, $C_6$–$C_{20}$-aryl or $C_7$–$C_{12}$-aralkyl each optionally substituted by halogen and/or by $C_1$–$C_{10}$-alkyl,
or
$R^5$ and $R^6$ in the case of formula (IId) form an alkyl chain,
Me represents a metal selected from main groups 1 to 3 and subsidiary groups VIII, 1B and 2B of the periodic system,
and q is determined by the valence of the metal ion,
F) 0 to 5 parts by weight of fluorinated polyolefin,
the sum of the parts by weight of all the components of the blend being 100.

6. The thermoplastic molding composition of claim 5 wherein
A is present in an amount of 60 to 98.5 parts by weight,
B is present in an amount of 1 to 40 parts by weight,
C is present in an amount of 0 to 30 parts by weight,
D is present in an amount of 1 to 25 parts by weight,
E is present in an amount of 1 to 18 parts by weight and
F is present in an amount of 0.1 to 1 part by weight.

7. The thermoplastic molding composition of claim 5 wherein
B is present in an amount of 2 to 25 parts by weight
D is present in an amount of 2 to 20 parts by weight
E is present in an amount of 2 to 15 parts by weight and
F is present in an amount of 0.1 to 0.5 part by weight.

8. The thermoplastic molding composition of claim 5 wherein C is present in an amount of 2 to 25 parts by weight.

9. The thermoplastic molding composition of claim 5 wherein B.1 is a mixture of
B.1.1 50 to 99 parts by weight of vinyl aromatic compounds and/or vinyl aromatic compounds substituted at the ring and/or methacrylic acid ($C_1$–$C_4$)-alkyl esters and
B.1.2 1 to 50 parts by weight of vinyl cyanides and/or (meth)acrylic acid ($C_1$–$C_8$)-alkyl esters and/or derivatives of unsaturated carboxylic acids.

10. The thermoplastic molding composition of claim 5 wherein B.2 is at least one member selected from the group consisting of diene rubbers, EP(D)M rubber, acrylate, polyurethane, silicone, chloroprene and ethylene/vinyl acetate rubbers.

11. The thermoplastic molding composition of claim 5 further containing at least one additive selected from the group consisting of lubricating and mould-released agents, nucleating agents, antistatics, stabilizers, colorings and pigments.

12. A process for producing the composition of claim 5 comprising mixing and melt compounding components A to F and, optionally, other additives.

13. A method of using the blend of claim 1 comprising molding an article.

14. A molded article comprising the blend of claim 1.

15. A molded article comprising the composition of claim 5.

* * * * *